(12) United States Patent
Wittenberg et al.

(10) Patent No.: US 6,927,725 B2
(45) Date of Patent: Aug. 9, 2005

(54) SYSTEM AND METHOD FOR RADAR DETECTION AND CALIBRATION

(75) Inventors: Peter S. Wittenberg, Creve Coeur, MO (US); John Hayn, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 47 days.

(21) Appl. No.: 10/735,566

(22) Filed: Dec. 12, 2003

(65) Prior Publication Data

US 2005/0128136 A1   Jun. 16, 2005

(51) Int. Cl.$^7$ ............................................... G01S 7/40
(52) U.S. Cl. ..................... 342/174; 342/165; 342/173; 342/175; 342/195
(58) Field of Search .. 244/3.1–3.3; 89/1.11; 342/5–20, 342/27, 28, 42–51, 61–65, 118–146, 165–175, 342/187–197, 450–465

(56) References Cited

U.S. PATENT DOCUMENTS

| | | | | |
|---|---|---|---|---|
| 2,637,028 A | * | 4/1953 | Mcilwain .................... 342/174 |
| 2,802,207 A | * | 8/1957 | O'Neal et al. .............. 342/174 |
| 2,823,376 A | * | 2/1958 | Baldwin et al. ................ 342/9 |
| 2,866,192 A | * | 12/1958 | Johnson et al. ............. 342/119 |
| 2,869,120 A | * | 1/1959 | Lolmaugh et al. ............. 342/9 |
| 2,898,058 A | * | 8/1959 | Del Mar ........................ 342/9 |
| 2,921,301 A | * | 1/1960 | Cartwright .................. 342/174 |
| 2,953,377 A | * | 9/1960 | Brust ............................. 342/9 |
| 3,010,103 A | * | 11/1961 | Hopper et al. ................. 342/9 |
| 3,010,104 A | * | 11/1961 | Powell ........................... 342/9 |
| 3,016,532 A | * | 1/1962 | Del Mar ........................ 342/9 |
| 3,086,202 A | * | 4/1963 | Hopper et al. ................. 342/9 |
| 3,121,227 A | * | 2/1964 | Franklin ........................ 342/9 |
| 3,128,463 A | * | 4/1964 | Hopper ......................... 342/9 |
| 3,137,852 A | * | 6/1964 | Hopper ......................... 342/9 |
| 3,357,014 A | * | 12/1967 | Atlas .......................... 342/146 |
| 3,573,826 A | * | 4/1971 | Fredericks et al. ......... 342/174 |
| 3,866,226 A | * | 2/1975 | Benneche et al. ............. 342/9 |
| 4,366,962 A | * | 1/1983 | Campbell et al. ............ 342/11 |

(Continued)

Primary Examiner—Bernarr E. Gregory
(74) Attorney, Agent, or Firm—Thompson Coburn LLP

(57) ABSTRACT

A system and method for radar detection and calibration. By measuring the true range of a calibration target on entry to the radar's detection zone, the actual detection capability of the radar in current atmospheric conditions with the actual radar can be determined. The radar system is also adapted to determine a sensed position at a sensed time of a target in the radar's detection zone. A calibration target, preferably an unmanned air vehicle (UAV), includes a position device for determining the actual position of the calibration target. A calibration device communicates with the radar system and the calibration target and receives the sensed and actual positions of the calibration target. The calibration device calculates the error between the sensed position and the actual position and adjusts the radar system to minimize the error. The target may include a signal augmentation device to augment the radar cross-section of the target to replicate the radar cross-sections of targets of various types. In this manner the true detection range of the radar system can be determined for various types of targets under existing atmospheric conditions.

23 Claims, 2 Drawing Sheets

U.S. PATENT DOCUMENTS

| | | | |
|---|---|---|---|
| 4,532,516 A * | 7/1985 | Frampton et al. | 342/47 |
| 5,223,840 A * | 6/1993 | Cronyn | 342/170 |
| 5,285,213 A * | 2/1994 | Tusch | 342/10 |
| 5,398,032 A * | 3/1995 | Tucker et al. | 342/9 |
| 5,431,568 A * | 7/1995 | Fey et al. | 342/174 |
| 5,530,449 A * | 6/1996 | Wachs et al. | 342/174 |
| 5,546,090 A * | 8/1996 | Roy et al. | 342/174 |
| 5,786,786 A * | 7/1998 | Small | 342/13 |
| 5,940,035 A * | 8/1999 | Hedrick | 342/462 |
| 6,184,829 B1 * | 2/2001 | Stilp | 342/174 |
| 6,507,307 B1 * | 1/2003 | Huber, Jr. | 342/9 |
| 6,529,157 B1 * | 3/2003 | Mensa et al. | 342/173 |

* cited by examiner

SYSTEM AND METHOD FOR RADAR DETECTION AND CALIBRATION

FIELD OF THE INVENTION

The present invention generally relates to a system and method for radar detection and calibration, and more particularly a radar detection and calibration system and method utilizing an unmanned air vehicle (UAV) as a calibration target.

BACKGROUND OF THE INVENTION

The performance of a radar system can be affected by atmospheric conditions, thereby providing erroneous information that can result in undesirable and even severe consequences. Atmospheric conditions and radar mechanical and electrical conditions can significantly reduce the radar's detection range such that the detection range is expected to be much greater than its true range given existing atmospheric conditions and radar condition. By way of example, a radar normally having a detection range of 100 miles may under particular atmospheric conditions have an actual range of 90 miles. Using a military application as an example, a radar used to detect enemy aircraft may, because of existing atmospheric conditions and radar condition, actually see a target at significantly less than the expected range, resulting in less time being available to deploy defense systems or even gaps in detection coverage of a system of radars. To avoid such overestimates of actual radar performance, it has been known to use manned test aircraft to determine the true detection range. The manned test aircraft were flown between non-detection and detection zones, and by knowing the aircraft's actual position the radar's true detection range could be determined.

However, the use of manned test aircraft for this purpose is expensive and poses a safety risk to the pilot. Moreover, because they must be of a sufficient size to be manned, they are limited in their use as radar detection and calibration targets where small radar cross-sections are desired or required.

SUMMARY OF THE INVENTION

The present invention solves these problems, providing a system and method for radar detection and calibration that accounts for existing atmospheric conditions and radar condition without the need to use manned aircraft. Generally, in accordance with one aspect of the present invention a relatively small and inexpensive UAV is used to provide such detection and calibration, which may also include signal augmentation to simulate the radar cross-section of larger targets.

More specifically, the detection and calibration system generally comprises a calibration target and a calibration device. In accordance with a preferred embodiment of the invention, the calibration target comprises a UAV, a position device and a signal augmentation device. The position device is adapted to determine an actual position of the UAV at a given time, and the signal augmentation device is adapted to augment the radar cross-section of the target. The calibration device is in communication with the calibration target and a radar system, and is adapted to receive actual position parameter signals from the calibration target defining the actual position of the calibration target and sensed position parameter signals from the radar system defining the sensed position of the calibration target. A radar system error for calibrating the radar system may be determined from the actual and sensed position signals.

Further generally in accordance with the invention, the detection and calibration system and method are adapted to determine the true detection range of the radar system under existing atmospheric conditions and actual radar condition by controlling the flight of an UAV between non-detection and detection zones, monitoring the sensed and actual positions of the UAV, and detecting the radar's true range based upon the UAV's actual position relative to the radar system when the radar system detects the UAV at the radar's maximum range.

As another aspect of the invention, a signal augmentation device is provided to simulate various targets having radar cross-sections larger than the UAV used as a calibration target. The signal augmentation device generates a reflected radar signal from the UAV, the magnitude of which may be selected to simulate the radar cross-section of a target, such as for example, a ship or larger aircraft, that may have a radar cross-section several orders of magnitude greater than the non-augmented radar cross-section of the UAV. Using the signal augmentation of the invention, the radar system's true radar range may be determined under existing atmospheric conditions for various targets, including those having much larger radar cross-sections, without using the actual targets, which in most cases would be impractical.

Further features and advantages of the present invention, as well as the structure and operation of various embodiments of the present invention, are described in detail below with reference to the accompanying drawings.

DETAILED DESCRIPTION OF THE PREFERRED EMBODIMENTS

Figure 1:
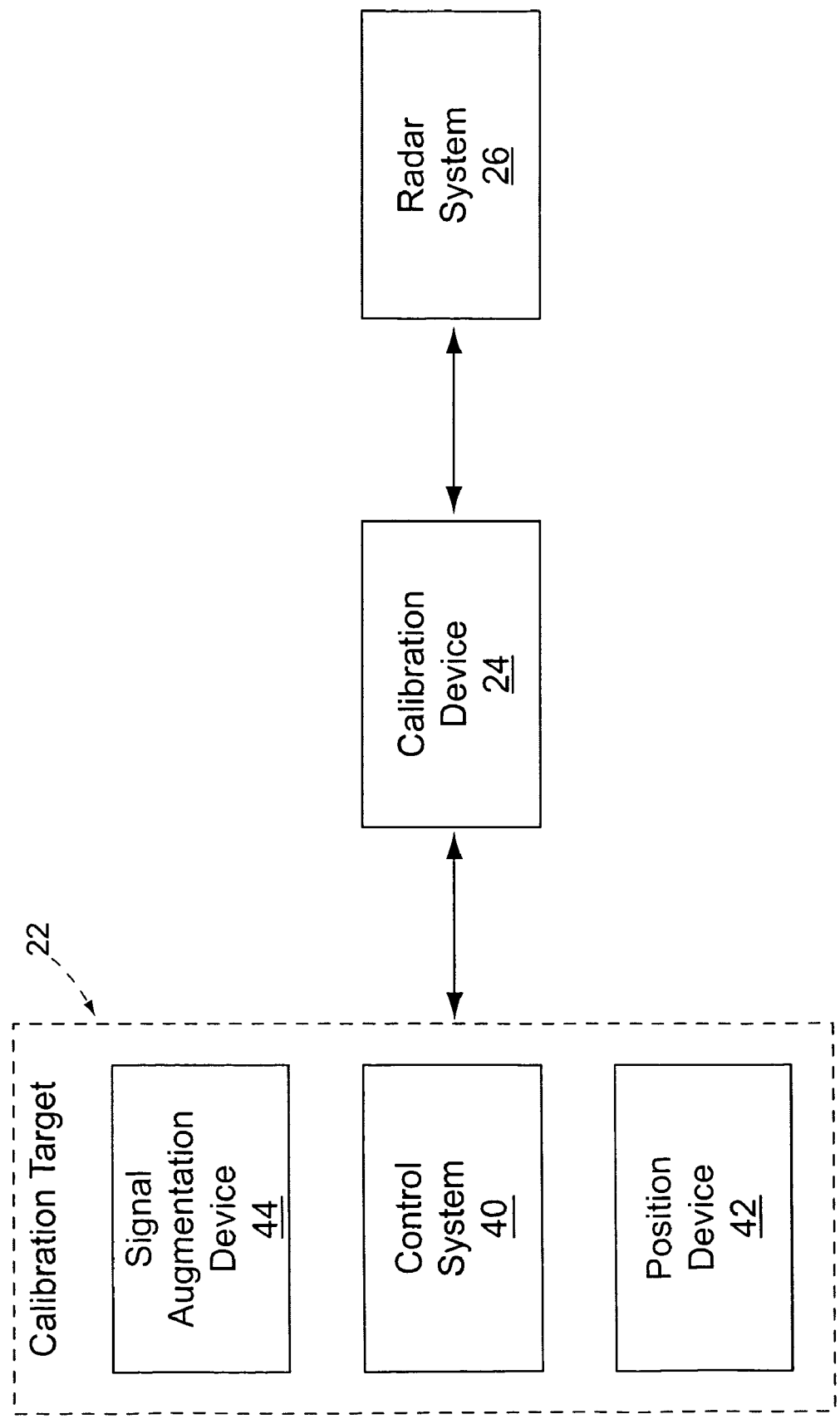
FIG. 1 is a block diagram of a calibration system and method according to a preferred embodiment of the present invention in communication with a radar system shown schematically.
Figure 2:
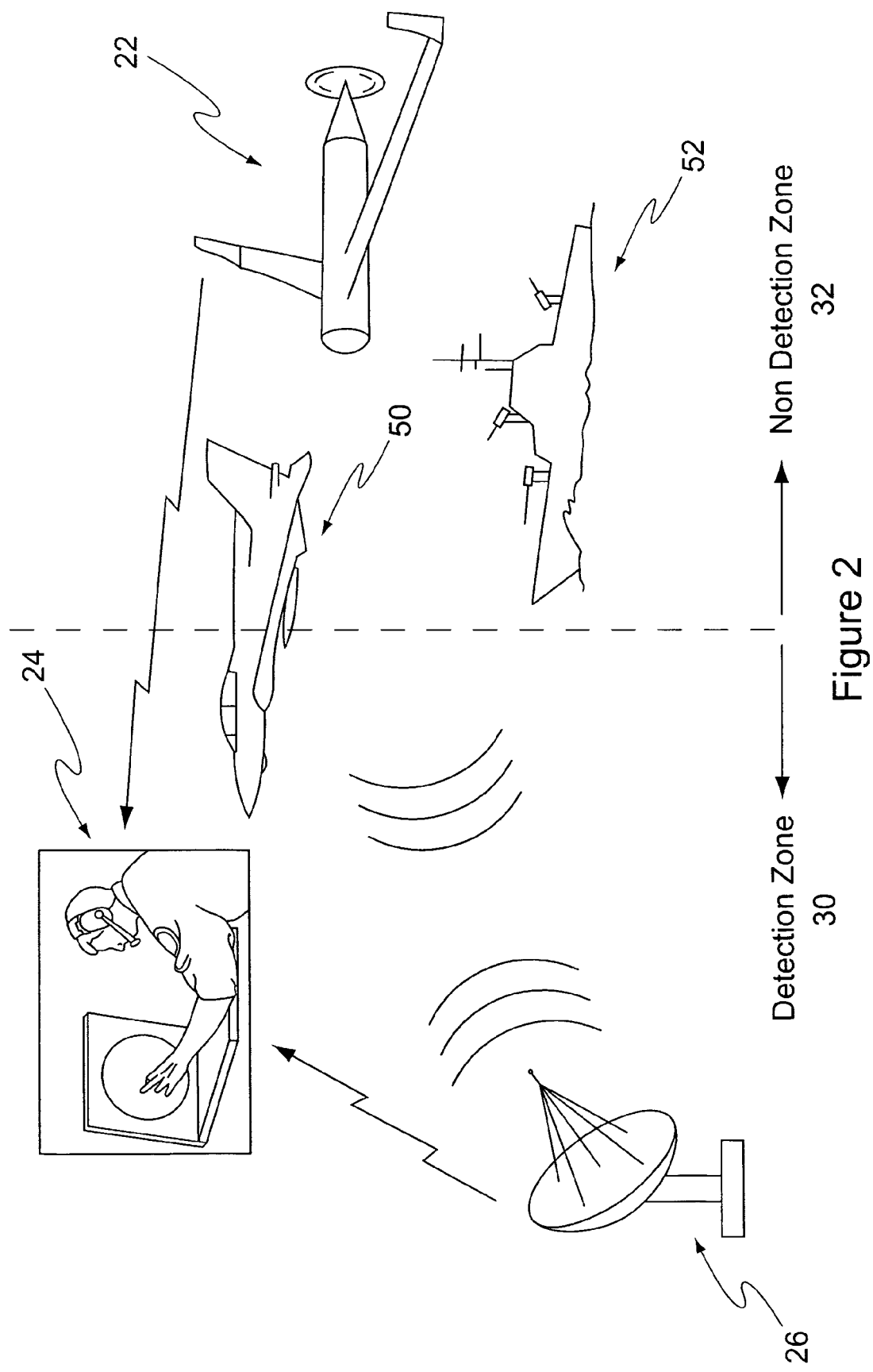
FIG. 2 is a diagram illustrating a preferred embodiment of the invention as used to detect a radar system's true radar range.

Referring to the drawings, there is shown a preferred embodiment of a radar detection and calibration system 20 of the invention generally comprising a calibration target 22 and a calibration device 24 for calibrating a radar system 26. The radar system 26 has a detection zone 30 for a particular target within which the radar system is able to detect the target. The size of the detection zone 30 is dependent upon the size of the target's radar cross-section, such that the greater the target's radar cross-section the greater the radar's detection zone for that target. The radar's non-detection zone is identified as the zone 32 extending beyond the detection zone.

The calibration target 22 is preferably a UAV, such as the BOEING SCAN EAGLE™, although any suitable UAV may be used. The UAV includes a control system 40 adapted to navigate the UAV, and a position device 42 adapted to provide an actual position of the UAV at any given time.

In accordance with a preferred embodiment of the invention, the calibration target 22 also includes a signal augmentation device 44 for augmenting the radar cross-section of the calibration target. The signal augmentation device 44 may be a mechanical reflector or more preferably may be implemented electronically. When electronically implemented, the radar signal is electronically amplified to a desired level and transmitted as the return signal which is interpreted by the radar system as a calibration target having an augmented radar cross-section. The device 44 may be a suitable broadband amplifier known in the art and available from various suppliers. For example, the device 44 may be a Signal Augmentation System (SAS) by Northrop Grumman. In this described preferred embodiment, the calibration target 22 may have a non-augmented radar cross-section of as little as a square meter or less which may be augmented by the augmentation device 44 to be several orders of magnitude greater, thus providing a range of available radar cross-sections that may be selected for range detection and calibration and may include, but is not limited to, radar cross-sections that approximate those of manned aircraft 50 and ships 52.

The calibration device 24 is in communication with the calibration target 22 and is configured to receive signals from the position device 42 defining the actual position at a given time of the calibration target 22. The calibration device 24 is also in communication with the signal augmentation device 44 and is configured to select a desired level of augmentation for the electronics of the augmentation device to replicate the radar cross-sections of actual targets having greater radar cross-sections than the calibration target without augmentation. The calibration device 24 also is in communication with the radar system 26 to receive a sensed position of the calibration target 22, and is configured to detect variances between the actual position received from the position device 42 and the sensed position received from the radar system 26. The calibration device 24 may be a separate computing device or alternatively may be integral with the radar system 26, and in either case its implementation is well within the skill of those in the art. The calibration device 24 compares the detected sensed and actual positions of the calibration target, and from this comparison calculates a sensing error that may be used to adjust the radar system to more accurately sense target positions within the detection zone.

In operation, the detection and calibration system and method of the invention may be used to detect the true radar range of a radar system under actual operational conditions, i.e., actual atmospheric conditions and actual radar condition. A UAV is programmed to navigate in accordance with a predetermined flight plan that takes it on a course that extends between a radar system's non-detection zones and detection. As the UAV flies the predetermined course, the system of the invention detects the position of the UAV upon the radar system detecting the UAV at the radar system's maximum radar range, whereby the UAV's actual position at the radar system's maximum radar range is the true radar range under existing atmospheric conditions. This same process may be repeated using the signal augmentation device 44 at various levels of radar cross-section augmentation to simulate targets of various sizes and configurations, and to determine the true radar range of the radar system for such targets. These true radar range detection procedures, whereby the true radar ranges for targets of various radar cross-sections are determined, may be carried out within a single flight or over multiple flights of the UAV.

The calibration system 20 may also be used to determine a sensing error of a radar system 26. In accordance with this application, the UAV is programmed with a flight path that places the UAV in the detection zone 30 of the radar system. At a selected detection time, the position device 42 and the radar system 26 transmit signals to the calibration device 24 representing the actual and sensed positions, respectively, of the UAV. The calibration device compares these signals and from the comparison reduces or eliminates the sensing error of the radar system.

Further in accordance with the invention, the UAV may also be used as a practice target for a radar system operator using the radar system 26. In accordance with this application, the UAV is programmed to fly in the detection zone 30, and the radar system operator uses the radar system 26 to determine a sensed position of the UAV.

While the present invention has been described by reference to specific embodiments and specific uses, it should be understood that other configurations and arrangements could be constructed, and different uses could be made, without departing from the scope of the invention as set forth in the following claims.

What is claimed is:

1. A calibration system for calibrating a radar system, the radar system having a detection zone and being adapted to determine a sensed position at a sensed time of a target in the detection zone, the system comprising:
    a calibration target having a non-augmented radar cross-section, the calibration target comprising a UAV having a position device and a signal augmentation device, the position device being adapted to determine an actual position of the UAV at an given time, the signal augmentation device being adapted to augment the radar cross-section of the target, and
    a calibration device in communication with the calibration target and adapted to receive the actual position from the position device of the calibration target, the calibration device being further in communication with the radar system and adapted to receive the sensed position of the target from the radar system, the calibration device being further adapted to detect a system error representing the difference between the actual position and the sensed position and provide the system error to the radar system.

2. A system as set forth in claim 1 wherein the non-augmented radar cross-section of said calibration device is less than the radar cross-section of manned aircraft.

3. A system as set forth in claim 2 wherein the non-augmented radar cross-section is less than about one square meter.

4. A system as set forth in claim 1 wherein the signal augmentation device is electronically adapted to receive a signal from the radar system and return an amplified signal to the radar system.

5. A system as set forth in claim 1 wherein the signal augmentation device is a reflector.

6. A method of calibrating a radar system, the radar system being adapted to determine a sensed position at a sensed time of a target in a detection zone, the method comprising:
    providing a calibration target, the calibration target comprising a UAV having a control system and a position device, the control system being adapted to navigate the UAV and the position device being adapted to determine an actual position of the UAV;
    navigating the calibration target within the detection zone;
    sensing a sensed position of the calibration target at a selected time;
    determining the actual position of the calibration target at the selected time;
    comparing the sensed and actual positions; and
    using said comparison to reduce sensing error of said radar system.

7. A method of detecting the true radar range of a radar system under existing atmospheric conditions and with the existing radar condition, the radar system being adapted to determine a sensed position at a sensed time of a target in a detection zone, the method comprising:

providing a calibration target, the calibration target comprising a UAV having a position device and a signal augmentation device, the position device being adapted to determine an actual position of the UAV, the signal augmentation device being adapted to augment the radar cross-section of the calibration target to an augmented radar cross-section;

navigating the target between the detection zone and outside the detection zone; and determining the true radar range of the radar system by identifying the actual position of the target when the target is located at the maximum range at which the radar system senses the target.

8. A method as set forth in claim 7 further comprising:
augmenting the radar cross-section of said calibration target.

9. A method as set forth in claim 7 further comprising:
prior to the moving step, setting the signal augmentation device such that the calibration target has an augmented radar cross-section.

10. A method as set forth in claim 9 wherein the signal augmentation device is electronically adapted to receive a signal from the radar system and return an amplified signal to the radar system.

11. A method as set forth in claim 9 wherein the signal augmentation device is a reflector.

12. A method as set forth in claim 7 wherein the non-augmented radar cross-section of said calibration device is less than the radar cross-section of manned aircraft.

13. A method as set forth in claim 7 wherein the non-augmented radar cross-section is less than about one square meter.

14. A system for calibrating a radar system, the radar system having a detection zone and being adapted to determine a sensed position at a given time of a target in the detection zone, the system comprising:

a UAV;

a position device adapted to determine an actual position of the UAV at a given time; and a calibration device in communication with said position device adapted to receive from said position device the actual position of the UAV, the calibration device also in communication with said radar system and adapted to receive from said radar system the sensed position of the UAV, the calibration device being further adapted to detect a radar system error from the actual and sensed positions for use in calibrating said radar system.

15. A system as set forth in claim 14 further comprising an augmentation device for augmenting the radar cross-section of the UAV.

16. A system as set forth in claim 15 wherein the non-augmented radar cross-section of the UAV is less than about one square meter.

17. A system as set forth in claim 15 wherein the augmentation device is electronically adapted to receive a radar signal from said radar system and return an amplified signal to the radar system.

18. A system as set forth in claim 15 wherein the augmentation device is a reflector.

19. A method of calibrating a radar system, the radar system being adapted to determine a sensed position at a sensed time of an object in a detection zone, the method comprising:

providing a UAV;

navigating the UAV within the detection zone;

sensing a sensed position of the UAV at a selected time;

determining the actual position of the UAV at the selected time;

comparing the sensed and actual positions; and using said comparison to calibrate said radar system.

20. A method of detecting the true radar range of a radar system under existing atmospheric conditions, the radar system being adapted to determine a sensed position at a given time of an object in a detection zone, the method comprising:

providing a calibration target;

providing an augmentation device adapted to augment the radar cross-section of the calibration target;

selecting a radar cross-section of the calibration target using the augmentation device;

navigating the calibration target between the detection zone and outside the detection zone; and determining the true radar range of the radar system by determining the actual position of the calibration target when the calibration target is located at the maximum range at which the radar system senses the calibration target.

21. A method as set forth in claim 20 wherein said calibration target is an UAV.

22. A method as set forth in claim 20 wherein the augmentation device is electronically adapted to receive a signal from the radar system and return an amplified signal to the radar system.

23. A method as set forth in claim 20 wherein the augmentation device is a reflector.

* * * * *